United States Patent [19]

Harrison et al.

[11] Patent Number: 5,661,098

[45] Date of Patent: Aug. 26, 1997

[54] SUPPORTED MONOCYCLOPENTADIENYL ZIRCONIUM CATALYST

[75] Inventors: Daryll G. Harrison; P. Scott Chisholm, both of Calgary, Canada

[73] Assignee: Novacor Chemicals Ltd., Calgary, Canada

[21] Appl. No.: 584,815

[22] Filed: Jan. 11, 1996

[51] Int. Cl.$^6$ .................................................. C08F 4/42
[52] U.S. Cl. ...................... 502/120; 502/103; 502/117; 502/152; 526/129; 526/160; 526/901; 526/943
[58] Field of Search ............................. 502/103, 117, 502/120, 152; 526/120, 160, 901, 943

[56] References Cited

U.S. PATENT DOCUMENTS

| | | | |
|---|---|---|---|
| 4,542,199 | 9/1985 | Kaminsky et al. | 526/160 |
| 4,588,790 | 5/1986 | Jenkins, III et al. | 526/70 |
| 4,808,561 | 2/1989 | Welborn, Jr. | 502/104 |
| 4,935,397 | 6/1990 | Chang | 502/117 |
| 5,055,438 | 10/1991 | Canich | 502/117 |
| 5,064,802 | 11/1991 | Stevens et al. | 526/155 |
| 5,096,867 | 3/1992 | Canich | 502/103 |
| 5,126,301 | 6/1992 | Tsutsui et al. | 502/108 |
| 5,194,532 | 3/1993 | Hefner et al. | 502/126 |
| 5,227,440 | 7/1993 | Canich et al. | 526/129 |
| 5,240,894 | 8/1993 | Burkhardt et al. | 502/108 |
| 5,324,698 | 6/1994 | Ala-Huikku et al. | 502/126 |
| 5,446,001 | 8/1995 | Gurtzgen | 502/151 |

*Primary Examiner*—David W. Wu
*Attorney, Agent, or Firm*—Kenneth H. Johnson

[57] ABSTRACT

A catalyst prepared by firstly depositing a large amount of aluminoxane on a particulate support, then depositing a small amount of monocyclopentadienyl zirconium trihalide on the support. The catalyst is active for the polymerization of ethylene, optionally with a minor amount of other alpha olefins such as butene or hexene, particularly in a gas phase process.

4 Claims, No Drawings

5,661,098

SUPPORTED MONOCYCLOPENTADIENYL ZIRCONIUM CATALYST

FIELD OF THE INVENTION

This invention relates a supported catalyst useful for the polymerization of ethylene and the copolymerization of ethylene with lower alpha olefins such as butene-1; propylene; isobutylene; hexene-1; 4-methyl pentene-1; and octene. The invention further relates to an ethylene polymerization process which employs the supported catalyst.

BACKGROUND OF THE INVENTION

The use of "metallocene" catalysts for the polymerization of ethylene—i.e. catalysts which contain two cyclopentadienyl ligands—has been investigated for some 40 years, as evidenced by a series of patents which include U.S. Pat. No. 2,827,466 (Breslow, from a filing date of 27 Sep. 1955); U.S. Pat. No. 3,231,550 (Manyik, from a filing date of 4 Jun. 1964); and U.S. Pat. No. 4,542,199 (Kaminsky et al). Kaminsky et al discovered that certain aluminoxanes may activate zirconium-based metallocenes in a manner that produces a "single site" catalyst with spectacular productivity—a significant discovery which led to a large increase in research in this area of catalysis. Of particular relevance to the present invention, much investigation has been done on monocyclopentadienyl transition metal catalysts which are sometimes also referred to as "pseudometallocenes".

Although zirconium-based bis-metallocenes generally provide superior catalyst productivity in comparison to titanium-based metallocenes, the reverse is generally true with monocyclopentadienyl pseudo-metallocenes. This preference for titanium-based pseudo-metallocenes for ethylene polymerization is strongly reflected in the patent literature:

A. U.S. Pat. Nos. 5,055,438; 5,096,867; 5,227,440 These patents (which are assigned to Exxon) teach that so-called "constrained geometry" catalysts having one Cp ligand, one amido ligand and a bridging ligand between the Cp and amido, exhibit good productivity. The experimental data illustrate this claim for titanium-based complexes. There are no experimental data demonstrating the equivalence of the analogous zirconium complexes.

B. U.S. Pat. Nos. 5,064,802; 5,132,380 These patents, which are assigned to the Dow Chemical Company, provide experimental data which are similar to that provided in the above Exxon patents (i.e. the Dow patents provide experimental data which exhibit the desirable properties of "constrained geometry", monocyclopentadienyl titanium complexes but there are no experimental data which demonstrates the equivalence of the analogous zirconium complexes).

C. U.S. Pat. Nos. 5, 194,532 and 5,312,938 teach the preparation of cyclopentadienyl Ti (amido)$_3$ and indenyl Ti (amido)$_3$ complexes and ethylene polymerizations conducted in the presence and absence of methylaluminoxane in some of the complexes. There are no experimental data relating to the monocyclopentadienyl zirconium analogue.

D. U.S. Pat. No. 5,324,698 (assigned to Neste Oy) claims the use of a monocyclopentadienyl titanium trichloride catalyst deposited on a magnesium chloride/electron donor support. This catalyst is active in the presence of ordinary aluminum alkyls (i.e. aluminoxanes are not required to activate this catalyst, which is highly desirable in view of the high cost of methylaluminoxane). There is no suggestion that the zirconium analogue has any utility.

When a metallocene or a pseudometallocene catalyst is employed in a gas phase polymerization, it is highly preferred to use the catalyst in a supported form. It is also highly preferred that the catalyst does not cause reactor fouling. The art of preparing catalysts which do not lead to gas phase reactor fouling is not adequately understood, though it is generally accepted that the catalytic material should be very well anchored to the support so as to reduce the incidence of fouling resulting from the deposition of catalyst or cocatalyst which has dissociated from the support.

The preparation of supported metallocene and pseudo metallocene catalysts is reported in many U.S. patents including: U.S. Pat. No. 4,935,397 ("Chang", to Exxon); U.S. Pat. No. 4,808,561 ("Welborn", to Exxon); U.S. Pat. No. 5,240,894 ("Burkhardt" to Exxon); and the aforementioned Neste Oy patent, U.S. Pat. No. 5,324,698.

It is an object of this invention to provide a non-reactor fouling, supported pseudometallocene catalyst having good activity for ethylene co-(polymerization).

SUMMARY OF THE INVENTION

The present invention provides:

An olefin polymerization catalyst comprising essential elements (i), (ii) and (iii):
  (i) a particulate support;
  (ii) a monocyclopentadienyl zirconium component defined by the formula:

$$Cp\ Zr\ X_3$$

wherein Cp is cyclopentadienyl and each X is a halide (such as chlorine or bromine); and
  (iii) aluminoxane, wherein said catalyst is further characterized in that:
    (A) said catalyst is prepared such that said aluminoxane is first mixed with said support in the absence of said monocyclopentadienyl zirconium component;
    (B) said aluminoxane is present in said catalyst in an amount of from 200 milligrams to 500 milligrams per gram of said particulate support; and
    (C) the molar ratio of the aluminum (contained in the aluminoxane) to said zirconium is from 150:1 to 500:1 (i.e. the Al/Zr molar ratio must be from 150/1 to 500/1).

The present invention also provides:
A method for preparing polymers of ethylene, said method comprising effecting polymerization of ethylene, optionally with a minor amount of another $C_{2\ to\ 10}$ alpha olefin, in the presence of the supported catalyst defined directly above.

DETAILED DESCRIPTION

As an overview, the preparation of the supported pseudometallocene catalyst of this invention may generally be described with reference to two main steps:

Step I

A catalyst precursor is prepared by "anchoring" a large amount of an aluminoxane (preferably from 200 to 500 milligrams of methylaluminoxane per gram of support) on a particulate support. The support preferably contains hydroxyl groups which may react with the aluminoxane to effect the "anchoring". This precursor may either be used immediately in Step II or may be stored for later use.

Step II

The catalyst is then prepared by depositing a small amount of monocyclopentadienyl zirconium trichloride on the catalyst precursor. The amount of zirconium is so small that the resulting supported catalyst has an aluminum/zirconium molar ratio of at least 150/1.

Thus, the supported catalyst of this invention must satisfy the following criteria:

C1 the catalyst support must be particulate;

C2 a comparatively large amount of aluminoxane must be deposited on the support so as to prepare a catalyst precursor having from 200 to 500 milligrams of aluminoxane per gram of the particulate catalyst support;

C3 the aluminum to zirconium molar ratio of the final supported catalyst must be at least 150/1, which means that a very small amount of zirconium is used to prepare the catalyst; and C4 the zirconium must be provided in the form of monocyclopentadienyl trihalide (preferably monocyclopentadienyl trichloride).

Details concerning these criteria are described below.

C1: Support

Firstly, the catalyst support must be particulate and preferably contains surface hydroxyl groups.

The requirement that the support be "particulate" stems from the obvious fact that if the support isn't particulate, it won't fluidize properly in a gas phase reactor. Conventional alumina or silica supports are widely available items of commerce and are suitable for use in the present invention.

Such conventional silica and alumina supports are particulate, porous, contain surface hydroxyl groups and may contain adsorbed water. It is well known to those skilled in the art that the adsorbed water may be largely eliminated, and the level of active hydroxyl groups reduced, by heat treatment or "calcination". Additional descriptions of silica and alumina are widely available in the literature, including some of the aforementioned patents.

U.S. Pat. No. 4,935,397 (Chang) discloses a process for the preparation of a supported aluminoxane precursor by the reaction of an aluminum alkyl with a non-calcined or "wet" silica having adsorbed water. The support material of the present invention does not contain such adsorbed water.

A highly preferred support is a calcined, partially dehydroxylated silica having essentially no adsorbed water and a surface hydroxyl concentration of at least 0.2 milliequivalents of hydroxyl groups per gram of support.

C2: Aluminoxane Concentration

The supported aluminoxane precursor contains a large amount of aluminoxane which is "anchored" to the support.

Any aluminoxane which activates the monocyclopentadienyl zirconiun trichloride catalyst component is suitable.

Methylaluminoxane, a well known item of commerce which is prepared by the careful reaction of trimethyl aluminum with water, is highly preferred. (Note: the reaction of trimethyl aluminum with water is extremely violent, so care must be taken when preparing it.)

Whilst the precise structure of aluminoxanes which activate polymerization catalysts is still the subject of some argument, it is generally believed that they may be represented by the formula:

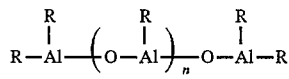

where n is about 10 and R is the alkyl group of the aluminum alkyl used to prepare the aluminoxane. For example, R is $CH_3$ for methylaluminoxane. Preferred aluminoxanes corresponding to the above formula are those in which R is methyl, ethyl or isobutyl (including mixtures thereof) with the methylaluminoxane being most highly preferred. Methylaluminoxane is now a readily available item of commerce.

In the previously referenced Chang patent, aluminoxanes are prepared in situ by a postulated reaction of the adsorbed water with the aluminum alkyls.

However, the support material of the present invention does not contain adsorbed water because the postulated reaction in the Chang reference may interfere with the preferred means of anchoring of the aluminoxane to the support. Thus, whilst not wishing to be bound by any particular theory, we believe that the deposition of an aluminoxane on a hydroxyl containing support will lead to a reaction which "anchors" the aluminoxane, as set out below:

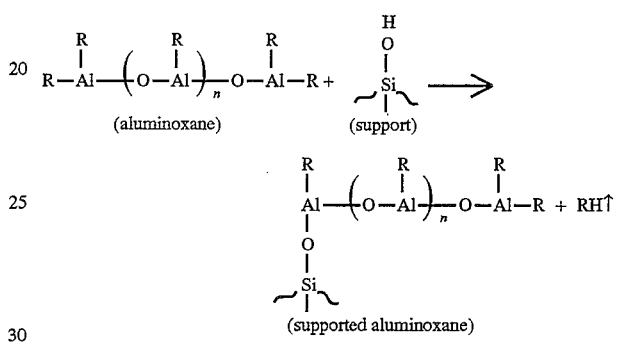

The method used for this deposition is not particularly difficult and may be completed by mixing a solution of aluminoxane with the support, as set out in U.S. Pat. No. 4,808,561. The preparation of a supported aluminoxane from a wet solvent, alkyl aluminum and support as set out in U.S. Pat. No. 5,446,001 is also suitable, provided that the resulting catalyst precursor contains from 200 to 500 milligrams of aluminoxane per gram of support.

It should be further noted that the deposition of a large amount, namely 20 to 50 weight %, of aluminoxane (based on the weight of the support material), may change the effective morphology of the support. Most notably, a porous support material—such as a conventional silica or alumina support—will have a significant portion of the pore volume effectively occupied by the so-anchored aluminoxane. Accordingly, the morphology of the supported aluminoxane precursor will be less irregular than that of the silica or alumina (to use an analogy: the silica or alumina starting material will have a porous morphology, whereas the supported aluminoxane precursor will have a smoother morphology—i.e. more like a "pool ball" because the aluminoxane will effectively occupy a substantial portion of the pore volume of the support). The term "effectively occupied" is used to attempt to describe two phenomena:

(a) the simple filling of the pore volume of the support (i.e. some pores may be completely filled with aluminoxane); and (b) blocking the top opening of a pore (i.e. if a pore is envisioned as a cylindrical or conical container—for example, a drinking glass—then the anchoring of aluminoxane at only the top of the pore may effectively occupy the total pore volume by making the bottom of the pore non-available).

C3: Al/Zr Ratio

The catalyst of this invention is substantially non-fouling (i.e. it does not lead to large deposits of undesirable material on the reactor walls during polymerization). Whilst not wishing to be bound by any particular theory, if is believed that this desirable catalyst behavior results from a number of necessary features of the catalyst including the high level of anchored aluminoxane and the high Al/Zr ratio.

Firstly, the aluminoxane is anchored on the support. It is believed that the deposition of the aluminoxane on a support having hydroxyl groups leads to a chemical reaction which "anchors" the aluminoxane. Thus, the aluminoxane is not able to easily dissociate from the catalyst support (which is desirable as dissociation is believed to be a contributor to reactor fouling).

Secondly, the requirement that a large amount of aluminoxane be supported is believed to be important for three reasons, namely:

2.1 The aluminoxane is thought to form an association complex with the monocyclopentadienyl zirconium catalyst species, thereby keeping the zirconium in the presence of the support (i.e. the high level of aluminoxane relative to the level of zirconium is believed to keep the zirconium associated with the support).

2.2 The large amount of aluminoxane which is deposited on the support reduces the effective porosity of the support. In turn, this is believed to produce a smoother morphology with less open pores. In turn, this is believed to reduce the probability that the active zirconium catalyst will penetrate into the pores of the catalyst. This lower amount of internally deposited zirconium is thought to reduce the tendency of the supported catalyst to "fracture" during polymerization, which is thought to mitigate reactor fouling problems stemming from "fractured" catalyst particles.

2.3 The high Al/Zr ratio on the supported catalyst eliminates the need to add extra uncomplexed or "free" aluminoxane to the reactor. (Note: the addition of extra, uncomplexed aluminoxane is highly undesirable and should not be done in the polymerization method of this invention.)

Finally, the requirement that the Al/Zr ratio be quite high means that the amount of zirconium will be quite low. The maximum amount of zirconium permissible corresponds to an Al/Zr ratio of 150/1 while the minimum amount of zirconium corresponds to an Al/Zr ratio of 500/1. The preferred Al/Zr ratio is from 150/1 to 250/1.

C4: Monocyclopentadienyl Zirconium Trihalide

The non-binding theory outlined above provides a starting point for the investigation of a supported catalyst having a high level of aluminoxane and a high Al/transition metal ratio in an effort to produce a non-fouling catalyst.

Another, non-binding element of theory is that a transition metal having only one cyclopentadienyl (or "Cp") ligand and three halide ligands may have a lower tendency to cause reactor fouling for two reasons which are described below.

Firstly, it is generally accepted that the transition metal species must be alkylated before becoming catalytically active. It is our view that the alkylation product forms a much stronger association complex with the aluminoxane than the non alkylated precursor. Accordingly, if it is desired to form an association complex between the transition metal and the aluminoxane so as to reduce the probability that a dissociated transition metal species will lead to reactor fouling, then our non-binding view is that three halide ligands on the transition metal precursor are preferable to two (i.e. by having three "alkylation sites" available instead of two, our view is that an increased level of alkylation will occur a larger percentage of time, thereby improving the probability of producing an alkylated transition metal complex which is strongly associated with the aluminoxane.

Secondly, the steric bulk of an unsubstituted monocyclopentadienyl species is lower than the steric bulk of the bis cyclopentadienyl metallocene analogue. Our view is that the lower steric bulk of a monocyclopentadienyl species decreases the probability of dissociation from the aluminoxane (i.e. a bis-Cp metallocene is, in our view, more likely to dissociate from the aluminoxane than the mono Cp complexes used in this invention).

Monocyclopentadienyl zirconium trichloride is preferred for convenience but the use of other analogous halides—e.g. the tribromide is permissible.

C4: Monocyclopentadienyl Zirconium Trichloride

The non-binding theories outlined above provide a starting point for the investigation of a supported catalyst based upon a high level of anchored aluminoxane, a high Al/transition metal ratio and a monocyclopentadienyl transition metal trihalide.

In view of the teachings in the patent literature pertaining to pseudo metallocenes, monocyclopentadienyl titanium trichloride was a logical starting point as the catalyst component. Unfortunately, the use of monocyclopentadienyl titanium trichloride produced a completely inactive catalyst in our hands.

However, we discovered that the deposition of monocyclopentadienyl zirconium trichloride on a Supported aluminoxane precursor so as to provide a supported catalyst having an Al/Zr ratio of greater than 150/1 produces a very active catalyst for the preparation of high molecular weight polyethylene.

In summary, the criteria described above require the initial synthesis of a particulate support which contains anchored aluminoxane. It is highly preferred that the particulate support be partially dehydroxylated silica or alumina. The anchored aluminoxane effectively occupies some of the pore volume of the silica or alumina. Thus, the morphology of the support is altered by reducing the pore volume with the aluminoxane. A very small amount of monocyclopentadienyl zirconium trichloride is then deposited on the supported aluminoxane.

While not wishing to be bound by any particular theory, it is believed that this small amount of the monocyclopentadienyl is deposited close to the outer surface of the support, instead of deep within the pores of the support (as the available pore volume has been previously reduced by the anchored aluminoxane). The resulting catalyst is non-fouling, which is somewhat counter-intuitive (as one might initially guess that it is most desirable to have the active zirconium species located deep within the support pores in order to mitigate fouling).

The supported catalyst of this invention is suitable for use in the (co-)polymerization of ethylene in a gas phase, slurry or solution polymerization. However, the advantages of this catalyst are most pronounced in a gas phase polymerization process.

Gas phase polymerization processes are well known to those skilled in the art and are described, for example, in U.S. Pat. No. 4,588,790 (Jenkins et al). The polymerization process disclosed in the Jenkins et al patent is suitable for use in the present invention (with the exception that the present invention employs the aforedescribed supported monocyclopentadienyl zirconium trihalide catalyst instead of the supported titanium catalyst with the aluminum alkyl disclosed in Jenkins et al.

It should be expressly noted that many conventional gas phase processes employ a supported Ziegler Natta catalyst in combination with extra aluminum alkyl. Accordingly, the question of "extra aluminoxane: (for example, the addition of non-supported aluminoxane in analogy to the non-supported aluminum alkyl of conventional processes) should be addressed in the context of the process of this invention.

Extra aluminoxane is highly undesirable and should not be used. It will add to the expense of operating the process and quite possibly will contribute to reactor fouling.

Conversely, the addition of a very small amount of aluminum alkyl (from 0.1 to 0.2 moles of aluminum alkyl per mole of aluminum in the aluminoxane) is permissible.

The primary function of the aluminum alkyl (if used) is to scavenge impurities which may otherwise poison the catalyst. However, as some aluminum alkyls are themselves known to reduce the activity of certain metallocene catalysts, any use of aluminum alkyl is generally undesirable and should be avoided or undertaken with caution.

U.S. Pat. No. 5,126,301 suggests that alkyl aluminums having branched alkyls may activate metallocene catalysts. Although this suggestion is controversial, it is generally agreed that such aluminum alkyls (e.g. triisobutyl aluminum) are less harmful to the activity of metallocenes and hence they are the preferred "impurity scavengers" for use with the catalyst of this invention. (Note: If an aluminum alkyl is employed, the aluminum therein is not included when calculating the requisite Al/Zr ratio: i.e., the aluminum in the alumoxane must be sufficient to provide an Al/Zr ratio of at least 150/1).

FURTHER DETAILS ARE GIVEN BY THE FOLLOWING EXAMPLES.

Example 1: Preparation of Supported Aluminoxane

This example illustrates the preparation of a supported methylaluminoxane-on-silica catalyst precursor.

The silica employed was a commercially available silica sold under the trade name PQM53050 by PQ Corporation.

A flask containing 15.2 g of the silica was cooled to 0° C. and 140 ml of a toluene solution of purchased methylaluminoxane (containing about 17.7 grams of methylaluminoxane) was added dropwise to the flask via a cannula.

The resulting slurry was allowed to warm to room temperature, then heated to 35° C. with stirring and left overnight.

The following day, a clear upper layer and a light brown lower layer were observed in the flask. The upper layer was removed via cannula. The lower layer was dried under vacuum, then washed three times with 100 ml aliquots of dry toluene.

The majority of the toluene was then removed under vacuum to obtain a white, free-flowing product which was left to stand under an argon blanket for a two day weekend. The product was then dried for 24 hours at 35° C. under vacuum.

Analysis of the resulting supported methylaluminoxane on silica catalyst precursor showed it to contain about 41 weight % methylaluminoxane on the basis of the support (i.e. the weight of the aluminoxane divided by the weight of the silica was about 0.41).

Furthermore, as evidence for the effectiveness of MAO chemisorption, treatment of the support with hot toluene failed to yield solubilized aluminum containing species, as evidenced by neutron activation analysis.

Example 2: Comparative

This example illustrates the preparation of a [monocyclopentadienyl titanium trichloride]-on-[methylaluminoxane on silica] complex and the unsuccessful attempt to use the complex for ethylene polymerization.

Step 1. 0.036 g of $Cp_2TiCl_3$ was dissolved in a Schlenk tube with approximately 15 ml of toluene to form a clear yellow solution.

Step 2. 3 g of a previously prepared, supported methylaluminoxane-on-silica catalyst precursor (having a molar aluminum concentration of about 9.3 milligram moles (per gram of support) was slurried in about 35 ml of toluene.

Step 3. The $CpTiCl_3$ in toluene solution from Step 1 was added via cannula to the [methyelaluminoxane-on-silica] slurry of Step 2. The Schlenk tube which contained the $CpTiCl_3$ was washed twice with 10 ml aliquots of toluene and the washings were also added to the silica slurry. This slurry was left to sit overnight.

Step 4. The next day the slurry had turned a green-brown color. It was warmed to 45° C. with stirring for 2 hours. The slurry was then allowed to settle, producing a green-brown lower layer under a clear supernatant. The solids were recovered from the slurry, washed with two 50 ml aliquots of hexane then dried under vacuum to a brownish powder.

Step 5. The dried powder was analyzed and found to contain 0.0508 m moles of titanium per gram of catalyst, thus providing an aluminum/titanium molar ratio of about 173/1.

Step 6. A slurry of dried powder in a paraffinic oil sold under the trademark "KAYDOL™" was then prepared by mixing 692 mg of the dried powder with 15 ml of KAYDOL oil (thus providing a slurry having a titanium concentration of $2.5 \times 10^{-3}$ m moles of titanium per ml of slurry).

Step 7. Gas phase polymerization was then attempted using the slurry from Step 6. The following conditions were employed in a laboratory scale (2 liter) batch reaction:

| | |
|---|---|
| ethylene pressure: | 200 pounds per square inch gauge (200 psig) |
| temperature: | 90° C. |
| time: | 1 hour |

0.52 ml of a triisobutyl aluminum "TIBAL" in heptane solution (24.5 weight % TIBAL) was added to the reactor as an impurity scavenger. One ml of the "catalyst" slurry ($2.5 \times 10^{-3}$ m moles of titanium) was then added to the reactor. Essentially no polymer was produced during the attempted reaction.

Step 8. In view of the negative result from Step 7, another attempted reaction was undertaken the following day using the same conditions. Again, essentially no polymer was produced.

Example 3: [Inventive]

This example illustrates the preparation of a [[monocyclopentadienyl zirconium trichloride]-on-[methylaluminoxane on silica] catalyst and the successful use of this catalyst in a non-fouling ethylene polymerization which produced high molecular weight polyethylene in high yield.

The procedures used to prepare the supposed catalyst were essentially the same as those used in the unsuccessful example 2, as were the polymerization procedures.

Step 1. 0.048 g of $CpZrCl_3$ was mixed with about 35 ml of toluene in a Schlenk tube. $CpZrCl_3$ was not very soluble, so the contents of the tube were warmed to about 50° C. in a hot oil bath.

Step 2. 3 g of a previously prepared, supported methylaluminoxane-on-silica catalyst precursor (having a molar aluminum concentration of about 9.3, milligram moles (per gram of support) was slurried in about 35 ml of toluene.

Step 3. The CpZrCl₃/toluene from Step 1 was added via cannula to the methylaluminoxane on silica slurry of Step 2. The Schlenk tube which contained the CpZrCl₃ was washed twice with 15 ml aliquots of toluene and the washings were also added to the silica/methylaluminoxane slurry. The slurry was observed to be a pale yellow color.

Step 4. The next day the slurry was warmed to 45° C. with stirring for two hours. The slurry was then allowed to settle, producing a yellow lower layer under a clear supernatant. The solids were recovered from the slurry, washed five times with 50 ml aliquots of toluene and twice with 50 ml aliquots of hexane. The washed solids were dried under vacuum to a beige powder.

Step 5. The dried powder was analyzed and found to have an aluminum/zirconium molar ratio of 205/1 (versus an expected ratio of about 170/1, indicating that some of the zirconium may have been lost during the preparation of the supported catalyst).

Step 6. A slurry of the dried powder from Step 5 in KAYDOL™ paraffinic oil was then prepared by mixing 892 mg of the dried powder with 15 mls of KAYDOL oil (thus producing a slurry having a zirconium concentration of $2.5 \times 10^{-3}$ m moles of zirconium per ml of slurry; alternatively stated, this corresponds to a zirconium weight concentration of about 0.228 mg of zirconium per ml of slurry).

Step 7. A successful gas phase polymerization was then completed using one ml of catalyst slurry from Step 6 in a two liter batch reactor.

The conditions employed were the same as those employed in comparative example 2, i.e.:

| ethylene pressure: | 200 psig |
| temperature: | 90° C. |
| time: | 1 hour |

0.52 ml of TIBAL in heptane (24.5 weight % TIBAL) was added as an impurity scavenger.

1 ml of the catalyst slurry ($2.5 \times 10^{-3}$ m moles of zirconium) was then added to the reactor.

The gas phase reaction was allowed to proceed for one hour, and produced about 24 grams of polyethylene obtained as a free-flowing granular product, corresponding to a yield of about 87,000 grams of polyethylene per gram of zirconium. The polyethylene had a very high molecular weight, as evidenced by a melt index (or "$I_2$", as determined by ASTM standard D1238) which could not be measured, an $I_{10}$ of 0.144 grams/10 minutes and an $I_{21}$ of 0.44 grams/10 minutes.

Analysis by high temperature size exclusion chromatography (SEC) showed the polymer had a weight average molecular weight (Mw) of 264 000 and a polydispersity (Mw/number average molecular weight, or Mn) of 2.0.

What is claimed is:

1. An olefin polymerization catalyst comprising essential elements (i), (ii) and (iii):

(i) a particulate support;

(ii) a monocyclopentadienyl zirconium component defined by the formula:

$$Cp\ Zr\ X_3$$

wherein Cp is cyclopentadienyl and each X is chloride; and (iii) aluminoxane, wherein said catalyst is further characterized in that:

(A) said catalyst is prepared such that said aluminoxane is first mixed with said support in the absence of said monocyclopentadienyl zirconium component;

(B) said aluminoxane is present in said catalyst in an amount of from 200 milligrams to 500 milligrams per gram of said particulate support; and (C) the molar ratio of the aluminum contained in said alumoxane to said zirconium is from 150:1 to 500:1.

2. The catalyst according to claim 1 wherein said aluminoxane is methylaluminoxane.

3. The catalyst according to claim 2 wherein said molar ratio of aluminum to zirconium is from 150:1 to 250:1.

4. The catalyst according to claim 3 wherein a methylaluminoxane on silica catalyst precursor is initially prepared by mixing calcined silica having residual hydroxyl groups and methylaluminoxane in a hydrocarbon slurry, followed by the deposition of said monocyclopentadienyl zirconium component on said methylaluminoxane-on-silica catalyst precursor.

* * * * *